C. B. CLARK.
Mop-Heads.

No. 145,397.　　　　　　　　　　　Patented Dec. 9, 1873.

Witnesses:
Charles M. Higgins
Arthur C. Fraser

Inventor:
Charles B. Clark.
Per Burke & Fraser, att'ys

UNITED STATES PATENT OFFICE.

CHARLES B. CLARK, OF BUFFALO, NEW YORK.

IMPROVEMENT IN MOP-HEADS.

Specification forming part of Letters Patent No. 145,397, dated December 9, 1873; application filed August 19, 1873.

*To all whom it may concern:*

Be it known that I, CHARLES B. CLARK, of Buffalo, in the county of Erie and State of New York, have invented certain new and useful Improvements in Mop-Heads, of which the following is a specification:

This improvement relates to that class of mop-heads having a cross-head and hollow shank or socket and a sliding clamping-wire, such as for which Letters Patent of the United States were granted me July 9, 1872; and it is the object of my present invention to so construct the cross-head that it may be molded and cast without the use of a core, and thereby effect a large saving in the cost of manufacture; and to that end it consists in forming said cross-head with the two lateral arms or extremities diminishing smoothly and gradually from the center or shank portion; and also in an improved method of securing the ends of the sliding clamping-wire in the collar by means of a nib cast in the recess for receiving the wire in one portion of the collar, in combination with a corresponding indentation formed in the wire.

Figure 1:
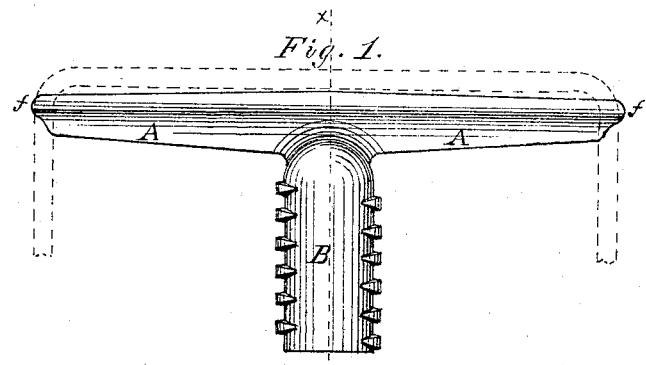
Figure 2:
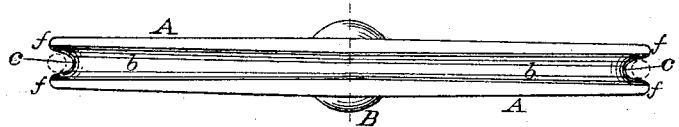
Figure 3:
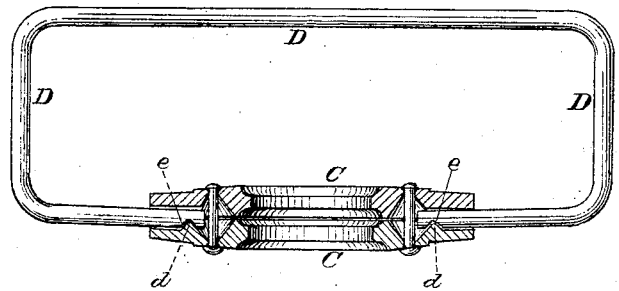
Figure 4:
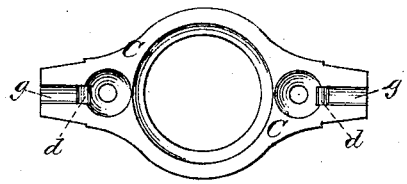

Figure 1 of the annexed drawings is an elevation of the cross-head and shank. Fig. 2 is a front view of the same. Fig. 3 is a central longitudinal section of the bisected collar, with the clamping-wire in elevation, showing the mode of securing the ends of the latter in the collar. Fig. 4 is a plan view of one-half of the bisected collar, showing the projections on the same for retaining the indented ends of the wire.

Heretofore the cross-heads of mops have been molded by dividing the flask longitudinally of the head and laying a core for the groove in the cross-head, and it has been difficult to make and lay the cores accurately, on account of their length and thinness. In order to be able to make them with greater accuracy and rapidity, I form the cross-head A with its arms slightly tapering from the center to each end, and the groove $b\ b$ is preferably correspondingly increased in depth and breadth from the center to either end, as seen in Figs. 1 and 2. This groove receives the sliding clamping-wire D, and is continued at the extremities into notches or recesses $c\ c$, formed at right angles therewith and between the lips $f\ f\ f\ f$, which serve as guides for the reception of the end portion of the sliding clamping-wire, and retain it in engagement with the cross-head at all times, as represented by the broken lines. The cross-head so constructed is molded by dividing the flask on a line which bisects the shank transversely of the head, as shown by the dotted line $x\ x$, whereby the pattern is drawn endwise of the cross-head, and no core is required for the groove $b\ b$. By this method sixteen cross-heads are molded in a flask where four only of the kind heretofore made could be cast, and the molding is done with much greater accuracy and perfection, effecting a large saving in the expense of manufacture. The cross-head as heretofore constructed has, on account of being formed with lateral projections, had to be placed horizontally, or on a plane with the division of the flask, thus requiring four times greater amount of space for molding. Upon one-half of the bisected collar C projections $d\ d$ are formed, which engage with corresponding recesses or notches $e\ e$ in the ends of the clamping-wire D, as seen in Figs. 3 and 4. The projections are formed in the grooves $g\ g$ of the collar, as seen in Fig. 4, and securely connect the wire with the collar when the two halves of the same are riveted together, as seen in Fig. 3, and it forms a very ready, facile, and reliable connection for these parts, and one cheaply made, as the nib or projection is cast and the indentations in the wire are produced by very simple means.

I claim as my invention—

1. In a mop-head, the cross-head A, the arms of which are formed with a diminishing exterior surface from the center to the ends, substantially as and for the purpose herein set forth.

2. In a mop-head having a cross-head and a sliding clamping-wire, the projections $d\ d$ on the collar C, in combination with the notches $e\ e$ on the wire D, substantially as and for the purpose set forth.

In witness whereof I have hereunto signed my name in the presence of two subscribing witnesses.

CHAS. B. CLARK.

Witnesses:
J. R. DRAKE,
T. H. PARSONS.